(12) United States Patent
Kajimura et al.

(10) Patent No.: US 11,948,328 B2
(45) Date of Patent: Apr. 2, 2024

(54) IMAGE-PROCESSING DEVICE, IMAGE-PROCESSING METHOD, AND IMAGE-PROCESSING PROGRAM

(71) Applicant: OLYMPUS CORPORATION, Hachioji (JP)

(72) Inventors: Kosuke Kajimura, Tokyo (JP); Atsuro Okazawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 482 days.

(21) Appl. No.: 17/366,162

(22) Filed: Jul. 2, 2021

(65) Prior Publication Data

US 2021/0335001 A1    Oct. 28, 2021

Related U.S. Application Data (63) Continuation of application No. PCT/JP2019/000311, filed on Jan. 9, 2019.

(51) Int. Cl.
| | |
|---|---|
| *G06K 9/00* | (2022.01) |
| *G06T 7/11* | (2017.01) |
| *G06T 7/73* | (2017.01) |

(52) U.S. Cl.
CPC . *G06T 7/73* (2017.01); *G06T 7/11* (2017.01)

(58) Field of Classification Search
CPC ... G06T 7/73; G06T 7/11; G06T 2207/10016; G06T 2207/20021; G06T 2207/20221; G06T 7/33; G06T 7/223
See application file for complete search history.

(56) References Cited

U.S. PATENT DOCUMENTS

| | | |
|---|---|---|
| 2009/0096879 A1 | 4/2009 | Motomura et al. |
| 2009/0207260 A1 | 8/2009 | Furukawa |
| (Continued) | | |

FOREIGN PATENT DOCUMENTS

| | | |
|---|---|---|
| EP | 2006805 A2 | 12/2008 |
| EP | 2219366 A1 | 8/2010 |
| (Continued) | | |

OTHER PUBLICATIONS

Yoon, Jaeyoung, and Daeho Lee. "Real-Time Video Stitching Using Camera Path Estimation and Homography Refinement." Symmetry 10.1 (2017): 4. (Year: 2017).*

(Continued)

*Primary Examiner* — Andrew M Moyer
(74) *Attorney, Agent, or Firm* — Holtz, Holtz & Volek PC (57) ABSTRACT

An image-processing device that includes at least one processor which is configured to: set discrete measurement regions in a standard image and a reference image selected from images acquired in a time series manner and calculate motion vectors in the respective measurement regions; set a region of interest in the standard image; select, from the calculated motion vectors, the motion vectors in the set region of interest; estimate a homographic-transformation matrix that represents a motion in the region of interest by using the selected motion vectors; evaluate an error in the homographic-transformation matrix on the basis of the estimated homographic-transformation matrix and the calculated motion vectors; and set, on the basis of the evaluation result for the homographic-transformation matrix estimated on the basis of a first region of interest, a second region of interest a size of which is increased as compared with that of the first region of interest.

14 Claims, 10 Drawing Sheets

(56) References Cited

U.S. PATENT DOCUMENTS

| | | | |
|---|---|---|---|
| 2009/0245692 A1 | 10/2009 | Okutomi et al. | |
| 2010/0007761 A1 | 1/2010 | Matsunaga et al. | |
| 2010/0209009 A1* | 8/2010 | Matsunaga .......... | H04N 25/134 |
| | | | 382/224 |
| 2014/0185866 A1* | 7/2014 | Lin ..................... | G06T 7/223 |
| | | | 382/218 |
| 2015/0117539 A1* | 4/2015 | Kobayashi .......... | H04N 19/176 |
| | | | 375/240.16 |
| 2020/0098119 A1 | 3/2020 | Okazawa et al. | |

FOREIGN PATENT DOCUMENTS

| | | |
|---|---|---|
| JP | H09212649 A | 8/1997 |
| JP | 2007257287 A | 10/2007 |
| JP | 2008065530 A | 3/2008 |
| JP | 2009188837 A | 8/2009 |
| JP | 2010021698 A | 1/2010 |
| JP | 2010193058 A | 9/2010 |
| JP | 2011171991 A | 9/2011 |
| JP | 2016126576 A | 7/2016 |
| WO | 2007108563 A1 | 9/2007 |
| WO | 2008114499 A1 | 9/2008 |
| WO | 2018221224 A1 | 12/2018 |

OTHER PUBLICATIONS

International Search Report (ISR) (and English language translation thereof) dated Feb. 12, 2019 issued in International Application No. PCT/JP2019/000311.

* cited by examiner

IMAGE-PROCESSING DEVICE, IMAGE-PROCESSING METHOD, AND IMAGE-PROCESSING PROGRAM

CROSS-REFERENCE TO RELATED APPLICATIONS

This is a continuation of International Application PCT/JP2019/000311 which is hereby incorporated by reference herein in its entirety.

TECHNICAL FIELD

The present invention relates to an image-processing device, an image-processing method, and an image-processing program.

BACKGROUND ART

As a technology for positioning a plurality of images, there is a method for modeling the amount of position displacement by means of a homographic-transformation matrix. With this method, with respect to a standard image and a reference image that are arbitrarily selected from a plurality of acquired images, the amounts of position displacement between images of characteristic regions are determined by means of optical flow, feature-point matching, or the like and geometric changes in the whole image are estimated by using information about the amount of position displacement, whereby the positioning amounts at individual pixel positions are calculated.

Regarding the calculation of the amounts of position displacement by employing a homographic-transformation matrix, it is possible to correctly calculate the direction and the magnitude of motion in the whole image so long as an imaging subject having depth is not included. However, in the case of an imaging subject having depth, in which short-distance planes and long-distance planes are mixed, the amounts of position displacement between images on an image-acquisition surface differ in accordance with the distance from the image-acquisition device to the imaging subject.

The amounts of position displacement on the image-acquisition surface increase with a decrease in the imaging-subject distance of an object, and the amounts of position displacement on the image-acquisition surface decrease with an increase in the imaging-subject distance. Accordingly, it is necessary to estimate an appropriate homographic-transformation matrix for each distance plane. In the case in which it is not possible to apply an appropriate homographic-transformation matrix to each region, it is not possible to correctly perform positioning, and thus, artifacts due to positioning errors occur.

In order to appropriately perform positioning, there is a known technology for setting a rule for selecting motion vectors for performing motion estimation of the whole image (for example, see Patent Literature 1). In addition, there is also a known technology for appropriately positioning a principal imaging subject by weighting motion vectors by utilizing information about principal-imaging-subject regions (for example, see Patent Literature 2).

CITATION LIST

Patent Literature

{PTL 1} Japanese Unexamined Patent Application, Publication No. Hei 9-212649

{PTL 2} Japanese Unexamined Patent Application, Publication No. 2009-188837

SUMMARY OF INVENTION

An aspect of the present invention is an image-processing device including: at least one processor including hardware, the processor being configured to: set a plurality of discrete measurement regions in a standard image and a reference image selected from a plurality of images acquired in a time series manner and calculate motion vectors in the respective measurement regions; set a region of interest in the standard image; select, from the plurality of calculated motion vectors, the motion vectors in the set region of interest; estimate a homographic-transformation matrix that represents a motion in the region of interest by using the selected motion vectors; evaluate an error in the homographic-transformation matrix on the basis of the estimated homographic-transformation matrix and the calculated motion vectors; and set, on the basis of the evaluation result for the homographic-transformation matrix estimated on the basis of a first region of interest, a second region of interest a size of which is increased as compared with that of the first region of interest.

In addition, another aspect of the present invention is an image-processing method including: setting a region of interest in the standard image; selecting, from the plurality of calculated motion vectors, the motion vectors in the set region of interest; estimating a homographic-transformation matrix that represents a motion in the region of interest by using the selected motion vectors; evaluating the homographic-transformation matrix on the basis of the estimated homographic-transformation matrix and the plurality of calculated motion vectors; and re-setting, on the basis of the evaluation result, a new region of interest a size of which is increased as compared with that of the set region of interest.

In addition, another aspect of the present invention is a non-transitory computer-readable medium having an image-processing program stored therein, the program causing a computer to execute functions of: setting a plurality of discrete measurement regions in a standard image and a reference image selected from a plurality of images acquired in a time series manner and of calculating motion vectors in the respective measurement regions; setting a region of interest in the standard image; selecting, from the plurality of calculated motion vectors, the motion vectors in the set region of interest; estimating a homographic-transformation matrix that represents a motion in the region of interest by using the selected motion vectors; evaluating the homographic-transformation matrix on the basis of the estimated homographic-transformation matrix and the plurality of calculated motion vectors; and re-setting, on the basis of the evaluation result, a new region of interest a size of which is increased as compared with that of the set region of interest.

DESCRIPTION OF EMBODIMENT

An image-processing device 1 according to an embodiment of the present invention will be described below with reference to the drawings.

Figure 1:
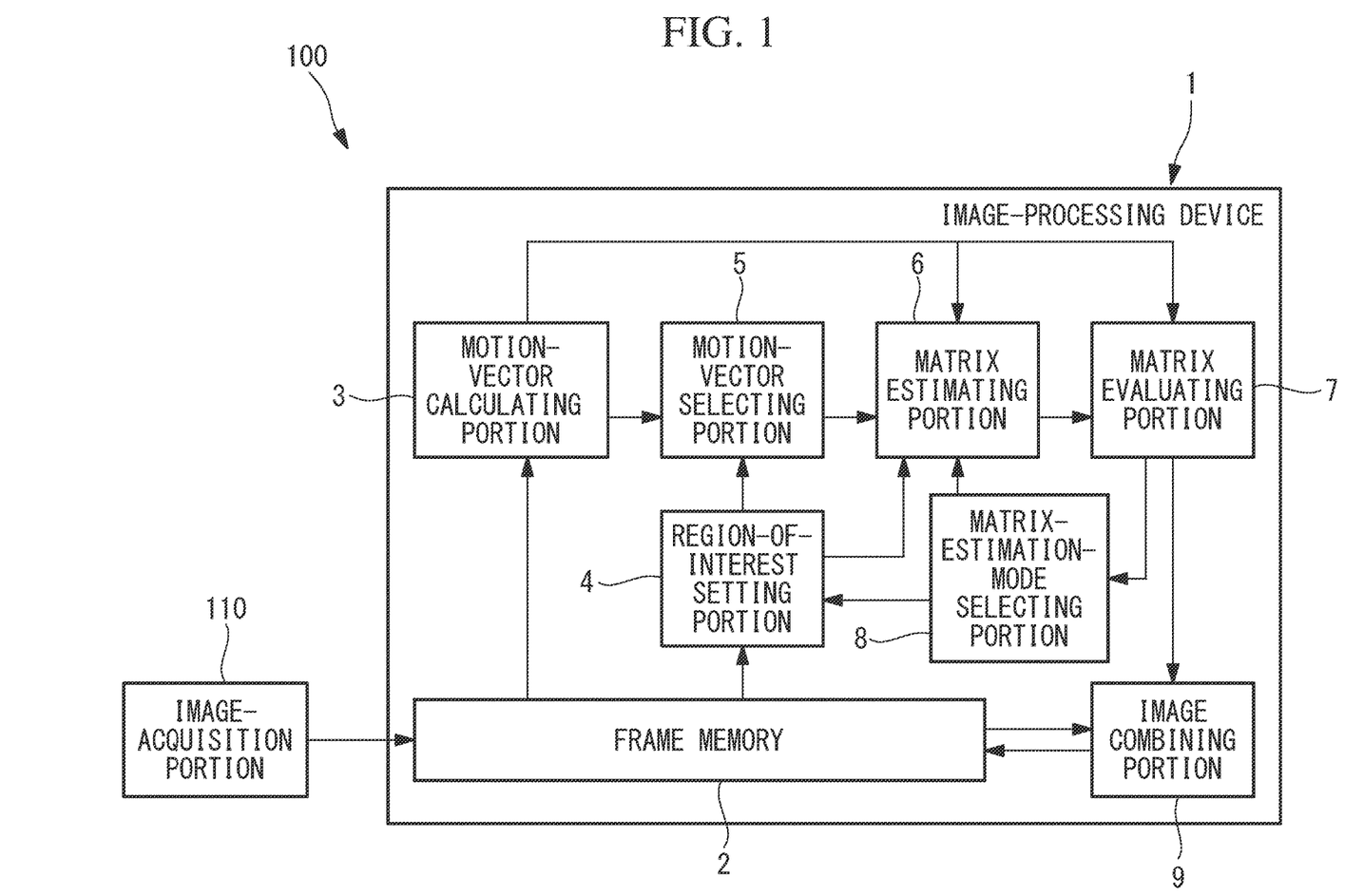
FIG. 1 is a block diagram showing an image-acquisition device including an image-processing device according to an embodiment of the present invention.

As shown in FIG. 1, the image-processing device 1 according to this embodiment is included in an image-acquisition device 100. The image-acquisition device 100 includes an image-acquisition portion 110 that acquires a plurality of images of an imaging subject in a time series manner. The image-acquisition portion 110 is a camera.

The image-processing device 1 includes: a frame memory 2, a motion-vector calculating portion 3, a region-of-interest setting portion 4, a motion-vector selecting portion 5, a matrix estimating portion 6, a matrix evaluating portion 7, a matrix-estimation-mode selecting portion 8, and an image combining portion 9. The image-processing device 1 is constituted of a processor and a memory.

The frame memory 2 sequentially stores the images and so forth acquired by the image-acquisition portion 110.

Figure 2:
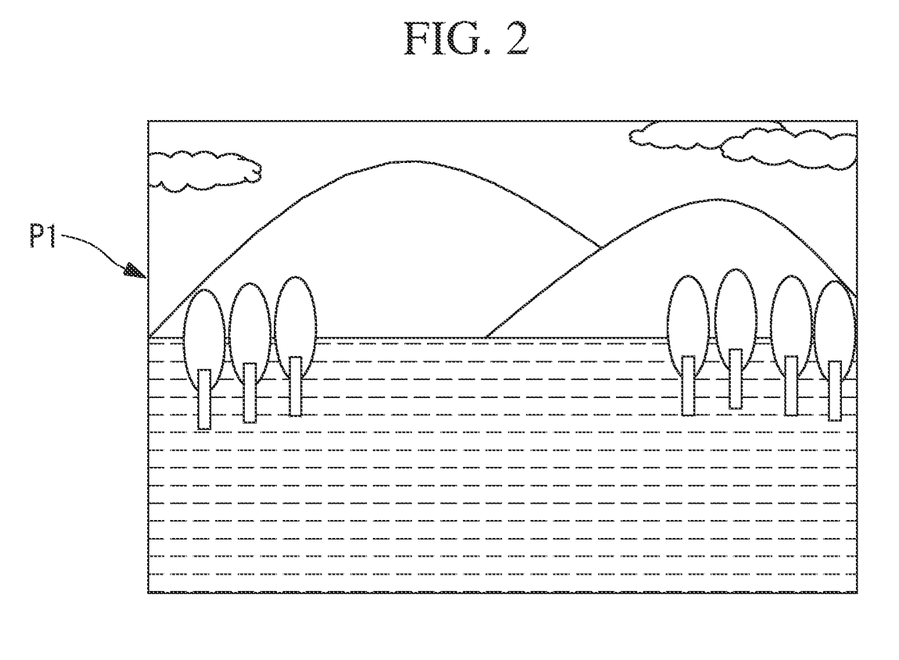
FIG. 2 is a diagram showing an example of a standard image acquired by means of an image-acquisition portion of the image-acquisition device in FIG. 1.
Figure 3:
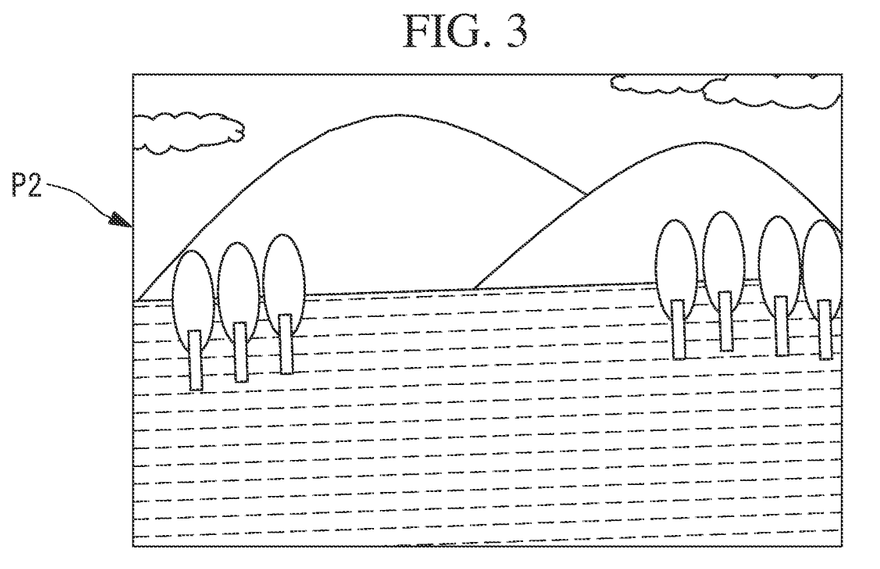
FIG. 3 is a diagram showing an example of a reference image acquired by means of the image-acquisition portion of the image-acquisition device in FIG. 1.

The motion-vector calculating portion 3 selects, from the images stored in the frame memory 2, a standard image P1 shown in FIG. 2 and a reference image P2 shown in FIG. 3, sets a plurality of discrete measurement regions A1 with respect to the selected standard image P1 and reference image P2, and calculates motion vectors in the respective set regions.

Figure 4:
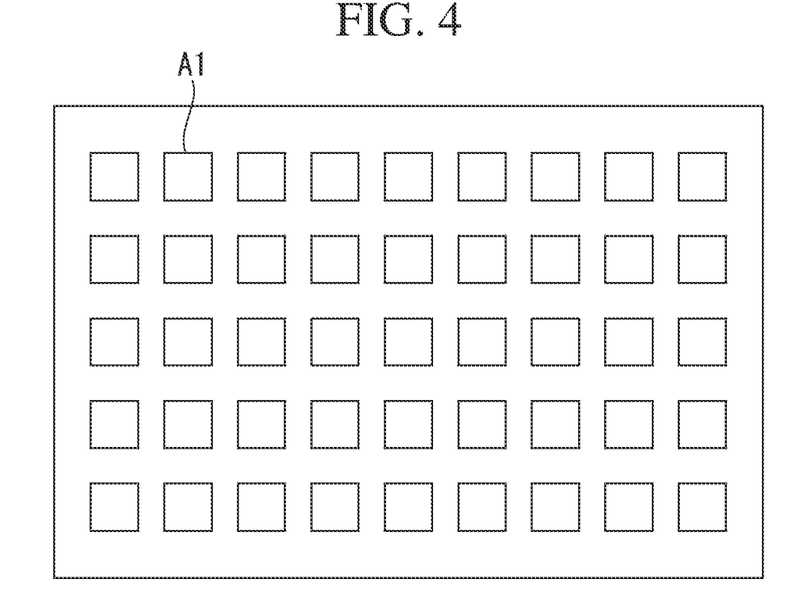
FIG. 4 is a diagram showing examples of measurement regions set in the standard image in FIG. 2 and the reference image in FIG. 3.
Figure 5:
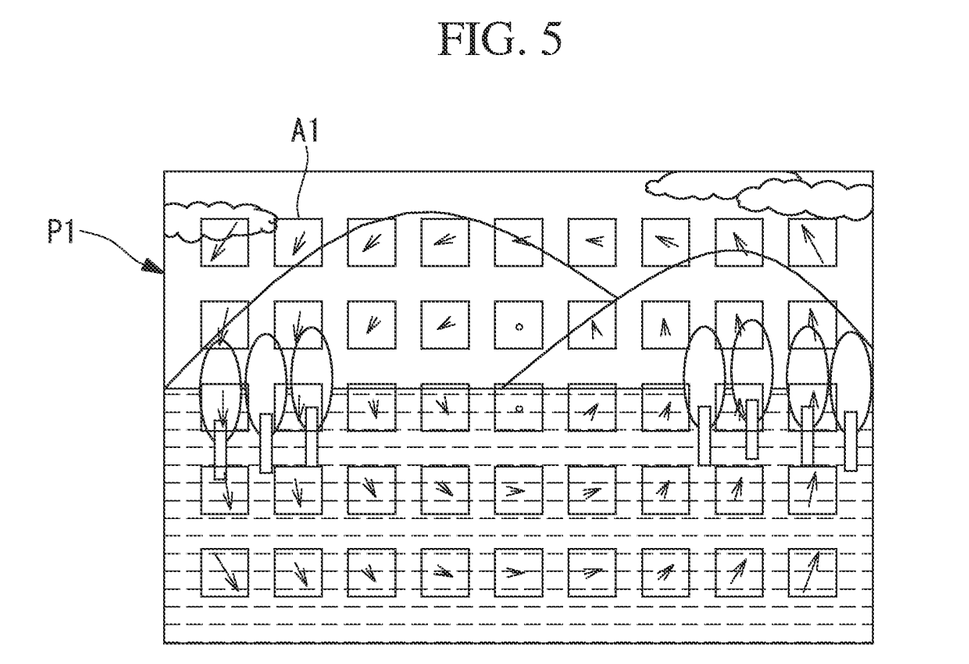
FIG. 5 is a diagram showing the measurement regions in FIG. 4 and motion vectors calculated for the respective measurement regions in a superimposed manner on the standard image in FIG. 2.

The motion-vector calculating portion 3 sets, for example, as shown in FIG. 4, a plurality of discrete regions in the standard image P1 and the reference image P2 such that a 32×32 pixel region serves as a single measurement region A1, and acquires, by using a publicly known method such as a block matching method, motion-vector values in the horizontal direction and the vertical direction in the image, as shown in FIG. 5. Furthermore, the motion-vector calculating portion 3 estimates, from an evaluation-value distribution, motion information at subpixel precision by using isometric linear fitting or parabolic fitting.

Figure 6:
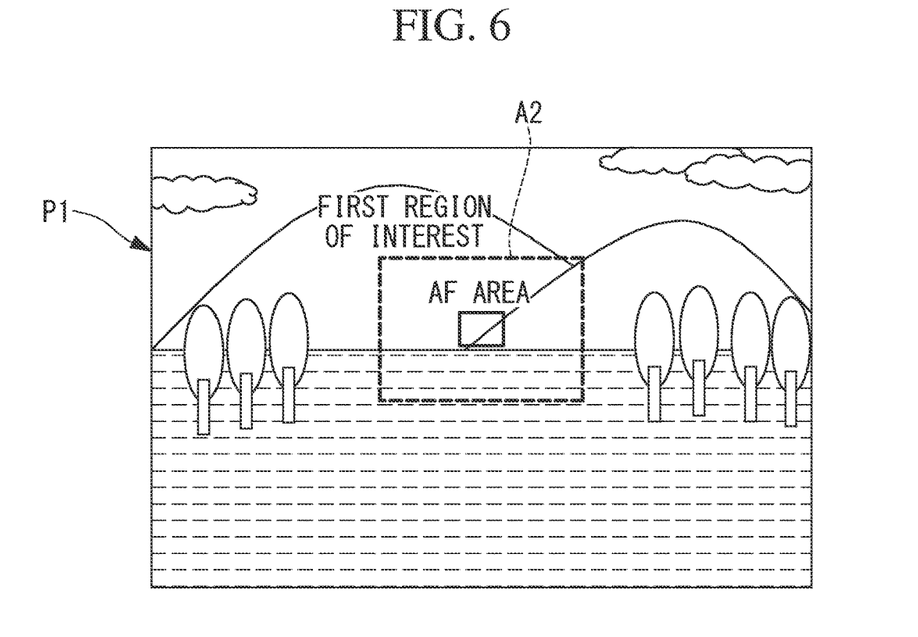
FIG. 6 is a diagram showing an example of a first region of interest set in the standard image in FIG. 2.

The region-of-interest setting portion 4 sets a region of interest A2 with respect to the images P1 and P2 stored in the frame memory 2. As shown in FIG. 6, the region-of-interest setting portion 4 sets a first region of interest (region of interest) A2 and re-sets a second region of interest (region of interest) A3 in which the size thereof is increased to be greater than that of the first region of interest A2 on the basis of an evaluation result in the matrix evaluating portion 7, described later.

As a method for setting the first region of interest A2, for example, the focus position at the time of acquiring the standard image P1 may be utilized. When the image is captured by setting an autofocus (AF) area, as shown in FIG. 6, when acquiring the standard image P1, a region including the AF area is set as the first region of interest A2. The first region of interest A2 may be set at a position and with a size at which at least a portion of the AF area is included. Note that the first region of interest A2 may be arbitrarily set by a user.

Figure 7:
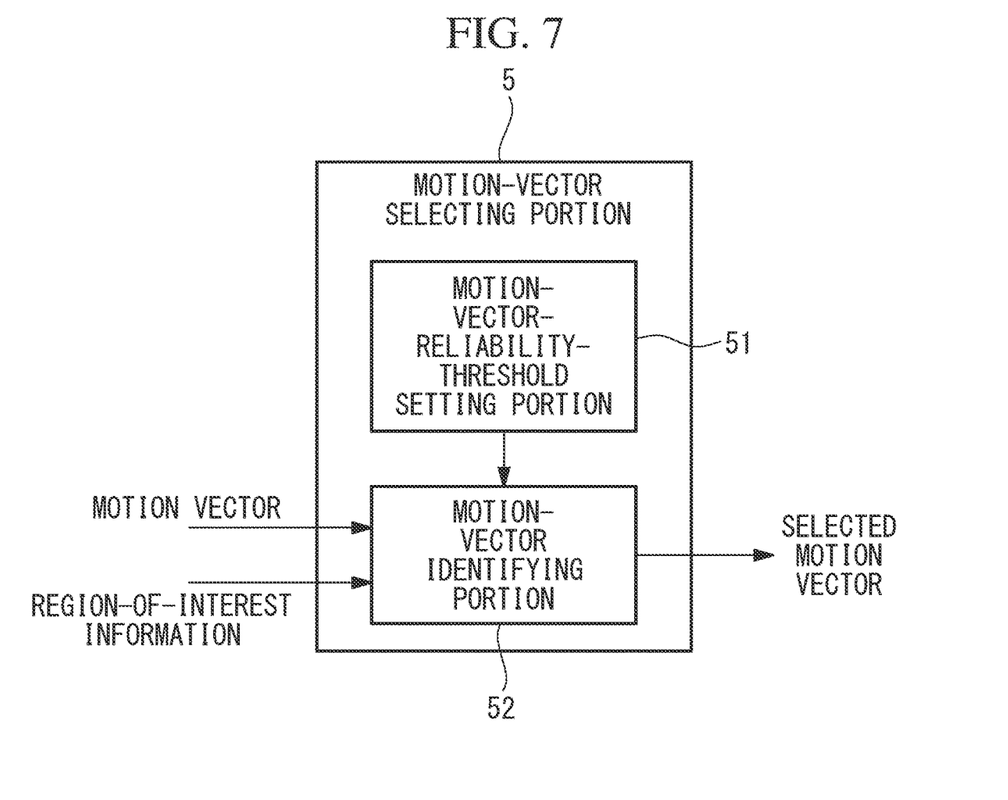
FIG. 7 is a block diagram showing a motion-vector selecting portion of the image-acquisition device in FIG. 1.

As shown in FIG. 7, the motion-vector selecting portion 5 includes a motion-vector-reliability-threshold setting portion 51 and a motion-vector identifying portion 52. The motion-vector-reliability-threshold setting portion 51 sets a threshold for the reliabilities of the motion vectors. The motion-vector reliabilities decrease in the case in which the subpixel-precision motion estimation is likely to fail, for example, the case in which the measurement regions A1 have low contrasts or have high-frequency striped patterns.

The motion-vector identifying portion 52 identifies, by using the threshold set by the motion-vector-reliability-threshold setting portion 51, only the motion vectors of the measurement regions A1 in which correct motions were considered to be successfully estimated and that are present in the region of interest A2.

In a certain scene, when an image shown in FIG. 2, which is captured first, is assumed to be the standard image P1 and an image shown in FIG. 3, which is captured second, is assumed to be the reference image P2, FIG. 5 shows examples of motion vectors calculated between the two images P1 and P2.

Figure 8:
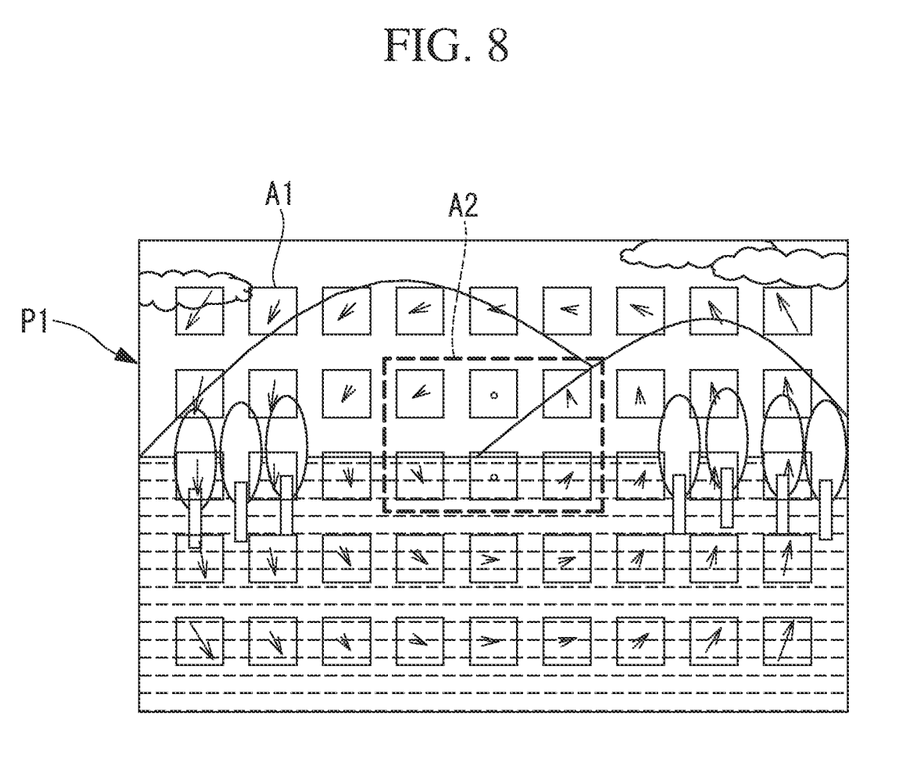
FIG. 8 is a diagram showing the first region of interest in FIG. 6 in a superimposed manner on FIG. 5.

The motion-vector identifying portion 52 identifies the motion vectors in the first region of interest A2 indicated by the broken line in FIG. 8.

The matrix estimating portion 6 calculates a homographic-transformation matrix from the motion vectors selected by the motion-vector selecting portion 5. It is possible to estimate the homographic-transformation matrix so long as information about motion vectors at four points, in other words, the position coordinates $(x\_n, y\_n)$ of the measurement regions of the motion vectors and motion vectors $(mvx\_n, mvy\_n)$ ($n=1, 2, 3, 4$) at those positions, are available. In the case in which there are numerous motion vectors, it is possible to estimate an optimal homographic-transformation matrix by using, for example, the publicly known RANSAC algorithm.

Figure 9:
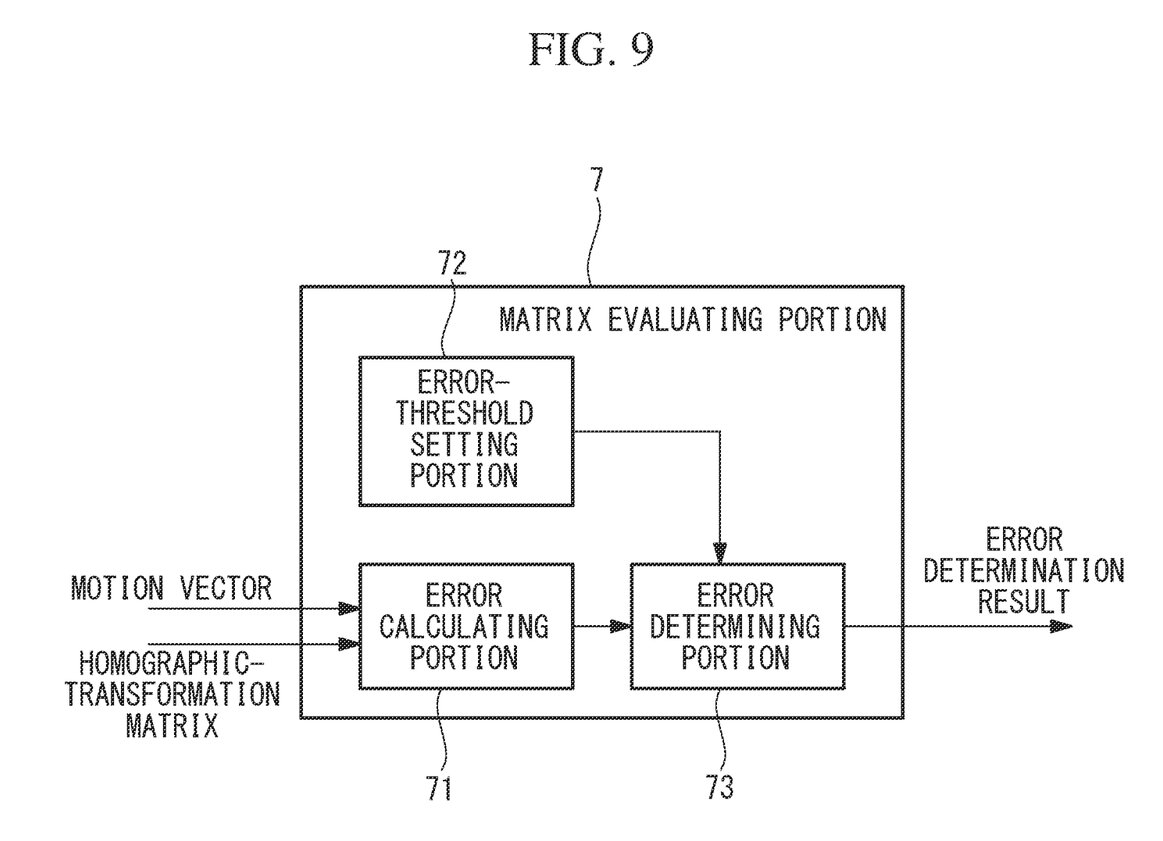
FIG. 9 is a block diagram showing a matrix evaluating portion of the image-acquisition device in FIG. 1.

As shown in FIG. 9, the matrix evaluating portion 7 includes an error calculating portion 71, an error-threshold setting portion 72, and an error determining portion 73.

The error calculating portion 71 calculates an error between the results of applying the homographic-transformation matrix to the position coordinates of the respective measurement regions A1 and the motion vectors. Assuming that (x, y) are the position coordinates of the measurement regions A1 in the standard image P1, for which the motion vectors have been calculated, and that an estimated homographic-transformation matrix H1 is expressed by Eq. 1, position coordinates (x', y') after the homographic transformation are expressed by Eq. 2.

$$H1 = \begin{pmatrix} h0 & h1 & h2 \\ h3 & h4 & h5 \\ h6 & h7 & 1 \end{pmatrix} \quad \text{(Eq. 1)}$$

$$x' = \frac{h0x + h1y + h2}{h6x + h7y + 1}, \quad y' = \frac{h3x + h4y + h5}{h6x + h7y + 1} \quad \text{(Eq. 2)}$$

In addition, assuming that the motion vectors at position coordinates (x, y) are (mvx, mvy), the error e of the homographic-transformation matrix H1 is expressed by Eq. 3.

$$e = ((x'-x)-mvx)^2 + ((y'-y)-mvy)^2 \quad \{\text{Eq. 3}\}$$

The error determining portion 73 compares a threshold e_TH set by the error-threshold setting portion 72 and the error e calculated by the error calculating portion 71. In the case in which the error e is less than the threshold e_TH, it is determined that the measurement region A1 can be appropriately positioned by using the estimated homographic-transformation matrix H1. In the case in which the error e is equal to or greater than the threshold e_TH, it is determined that, because a position displacement could occur as a result of positioning an image by using the estimated homographic-transformation matrix H1, the homographic-transformation matrix is inappropriate. The errors are evaluated for all of the position coordinates of the measurement regions A1 of the motion vectors in the standard image P1.

Figure 10:
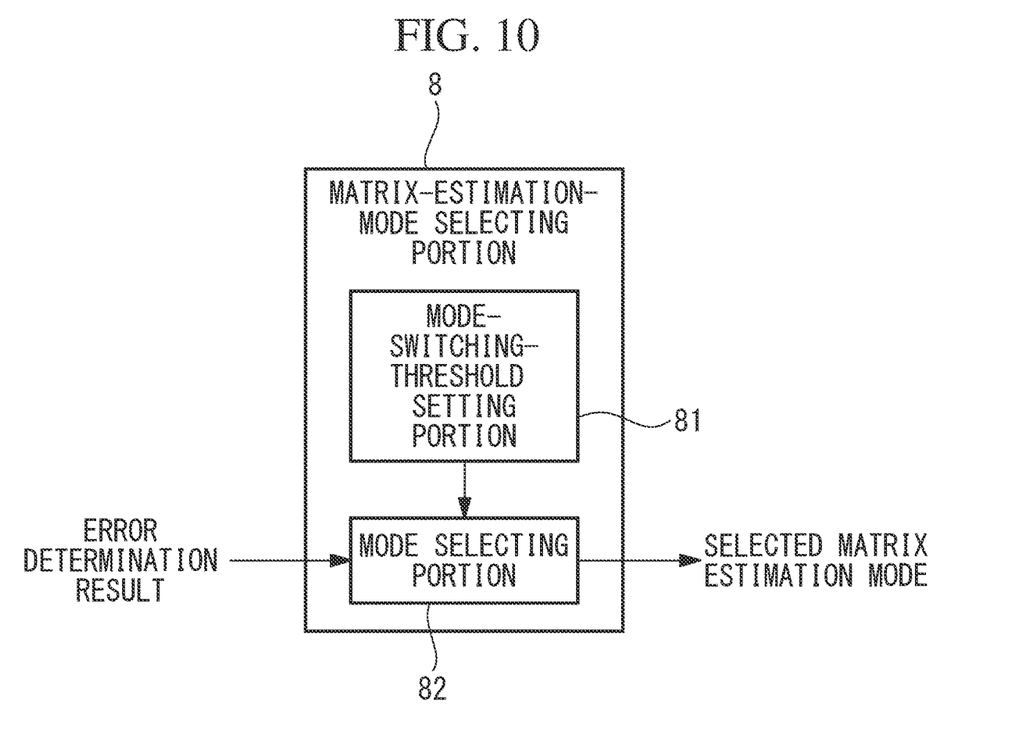
FIG. 10 is a block diagram showing a matrix-estimation-mode selecting portion of the image-acquisition device in FIG. 1.

The matrix-estimation-mode selecting portion 8 selects a matrix estimation mode on the basis of the evaluation result obtained in the matrix evaluating portion 7. As shown in FIG. 10, the matrix-estimation-mode selecting portion 8 includes a mode-switching-threshold setting portion 81 and a mode selecting portion 82, and selects a matrix estimation mode on the basis of the proportion of the number of motion vectors (number of inliers) that have been determined to be appropriate for performing positioning with respect to the number of all motion vectors, for which error determination has been performed by the matrix evaluating portion 7.

A modeTH, which is a threshold for performing mode switching, is set in advance, and, for example, the modeTH is 0.8 (80%). In this case, the mode is switched to a first mode when the number of inliers is equal to or greater than 80%, and the mode is switched to a second mode when the number of inliers is less than 80%. The first mode is a mode in which the region of interest A3 is re-set and the homographic-transformation matrix is re-estimated, and the second mode is a mode in which at least one homographic-transformation matrix that is different from the first homographic-transformation matrix is estimated.

Figure 11:
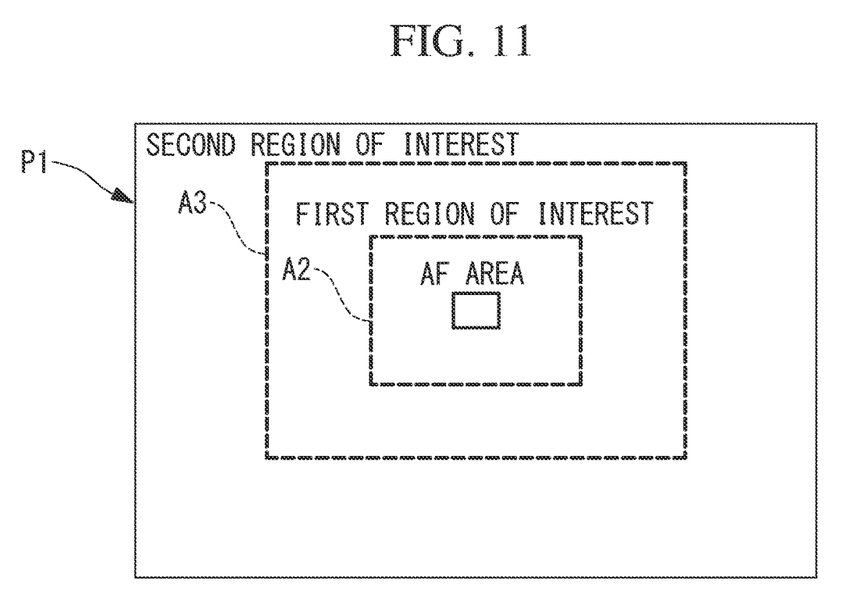
FIG. 11 is a diagram showing an example of a second region of interest set with respect to the first region of interest in FIG. 6.

Specifically, because the imaging subject is considered to be flat without depth in the case in which the first mode is selected by the mode selecting portion 82, the region of interest A3 is re-set by the region-of-interest setting portion 4 in order to appropriately position the whole standard image P1. As an example of re-setting, a second region of interest A3, in which the region size is increased as compared with the initial first region of interest A2, is set, as shown in FIG. 11. Also, a second homographic-transformation matrix H2 is estimated by using the set second region of interest A3.

Accordingly, it is possible to estimate the homographic-transformation matrix H2 by using peripheral motion vectors in the standard image P1 to a greater degree as compared with the case of estimating the homographic-transformation matrix H1 by using the first region of interest A2, and thus, a homographic-transformation matrix in which motions in the periphery of the standard image P1 are taken into consideration is more easily determined.

The image combining portion 9 combines the standard image P1 and the reference image P2 stored in the frame memory 2 by using the second homographic-transformation matrix H2 estimated by using the re-set second region of interest A3. Accordingly, it is possible to generate a combined image in which position displacement is small all the way to the image periphery.

Figure 12:
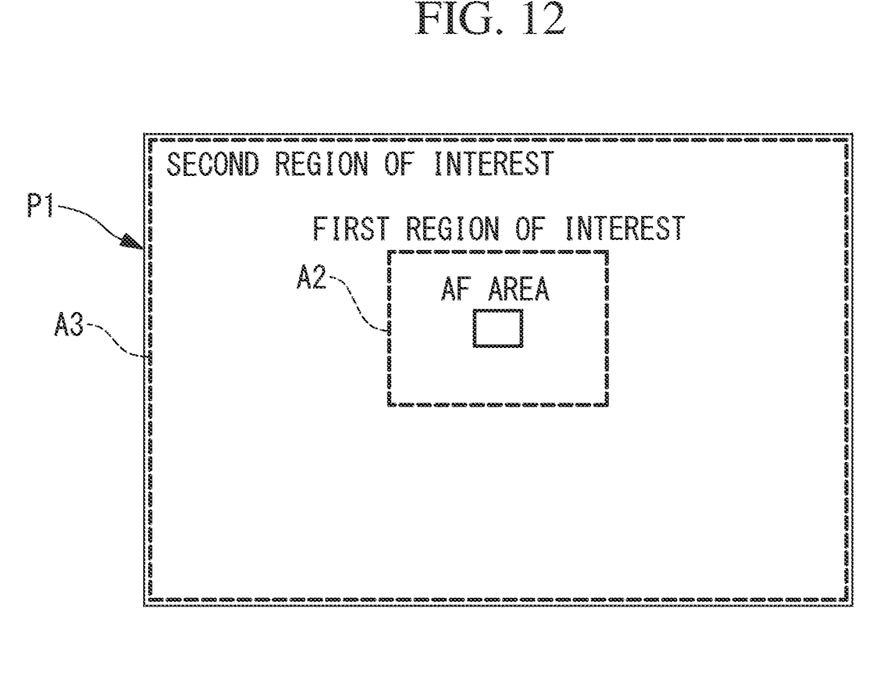
FIG. 12 is a diagram showing another example of the second region of interest set with respect to the first region of interest in FIG. 6.

Note that, as shown in FIG. 12, the method of setting the second region of interest A3 may re-set the whole image as the second region of interest A3. Accordingly, it is possible to calculate an appropriate homographic-transformation matrix H2 in which the motions in the image periphery are taken into consideration to a greater degree.

In addition, as another setting method, the size of the region to be increased may be determined on the basis of the image-capturing information of the captured images P1 and P2.

For example, it is conceivable to increase the region size to a greater degree with an increase in the aperture value that is used when capturing the images. In the case in which the imaging subject is flat, all parts of the images would be in focus when the aperture value is increased, and thus, the motion vectors between the images P1 and P2 are considered to be estimated in a precise manner; therefore, the size of the second region of interest A3 is increased. In contrast, the degree of focus decreases in the image periphery with a decrease in the aperture value even with a flat imaging subject, and thus, the precision of the motion-vector estimation could decrease; therefore, the size of the second region of interest A3 is decreased.

In addition, the size of the second region of interest A3 may be increased with an increase in the imaging-subject distance at the time of capturing the images P1 and P2. Because the motion amounts between the images P1 and P2 decrease with an increase in the imaging-subject distance, minute rotational components of the images may not be sufficiently estimated with a small region of interest A3. Therefore, it is possible to estimate an appropriate homographic-transformation matrix H2 by setting a second region of interest A3 having a size that becomes closer to the size of the whole images P1 and P2 with an increase in the imaging-subject distance. In addition, the size of the second region of interest A3 may be increased with a decrease in the lens focal distance.

In addition, there are many regions in which it is not possible to perform appropriate positioning by using the estimated homographic-transformation matrix H1 in the case in which the second mode is selected by the matrix-estimation-mode selecting portion 8; therefore, a different homographic-transformation matrix H2 is estimated by using the motion vectors of a plurality of measurement regions A1 in which the errors are equal to or greater than the threshold.

Figure 13:
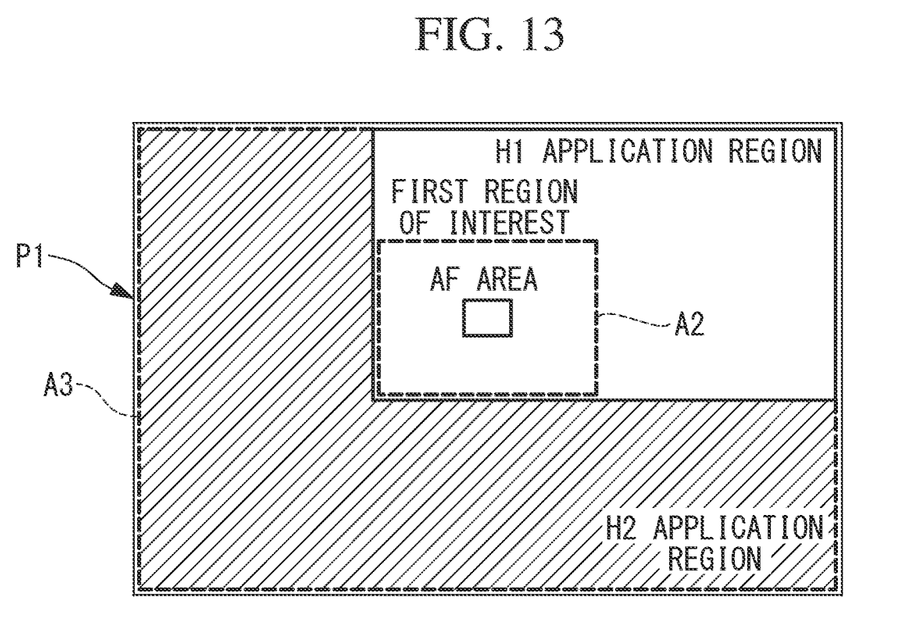
FIG. 13 is a diagram showing examples of regions to which two homographic-transformation matrices are applied in the case in which a second mode is selected by the matrix-estimation-mode selecting portion in FIG. 10.

For example, in the case in which, as a result of evaluating the homographic-transformation matrix H1 by means of the matrix evaluating portion 7 by using the homographic-transformation matrix H1 calculated from the first region of interest A2, measurement regions A1 in which the errors are less than the threshold are in a region surrounded by the thick-line frame and measurement regions A1 in which the errors are equal to or greater than the threshold are in the hatched region, as shown in FIG. 13, another homographic-transformation matrix H2 is determined by using the hatched region.

Accordingly, there is an advantage in that, in the image combining portion 9, it is possible to perform positioning while selecting an appropriate homographic-transformation matrix H1, H2 for each pixel or region by using the two homographic-transformation matrices H1 and H2.

Note that, in the case in which the second mode is selected, the homographic-transformation-matrix estimation may be ended after calculating only one different homographic-transformation matrix, or two or more different homographic-transformation matrices may be calculated. As the calculation procedure, a third homographic-transformation matrix H3 is determined in the case in which the proportion of the cases in which the errors are equal to or greater than the threshold is greater than a threshold hTH as a result of determining the homographic-transformation matrix H2 by means of the matrix estimating portion 6 and of evaluating the homographic-transformation matrix H2 by means of the matrix evaluating portion 7. The matrix estimation processing may be ended at the point in time when the proportion of the cases in which the errors are equal to or greater than the threshold becomes less than the threshold hTH.

The image combining portion 9 positions and combines the standard image P1 and the reference image P2 by using the one or more calculated homographic-transformation matrices. By doing so, it is possible to perform positioning while selecting an appropriate homographic-transformation matrix for each pixel or region by using n homographic-transformation matrices. The combined image combined by the image combining portion 9 is stored in the frame memory 2.

Note that the matrix estimating portion 6 may determine the motion vectors to be used when performing matrix estimation by means of the following method.

Specifically, after identifying the motion vectors that have high reliabilities and that are in the first region of interest A2 by means of the motion-vector selecting portion 5, center-of-gravity position coordinates of the identified motion vectors are calculated by the matrix estimating portion 6. Also, the first region of interest A2 is divided into four regions centered on the calculated center-of-gravity position, and the motion vectors to be used in matrix estimation are respectively determined from the divided four regions.

Figure 14:
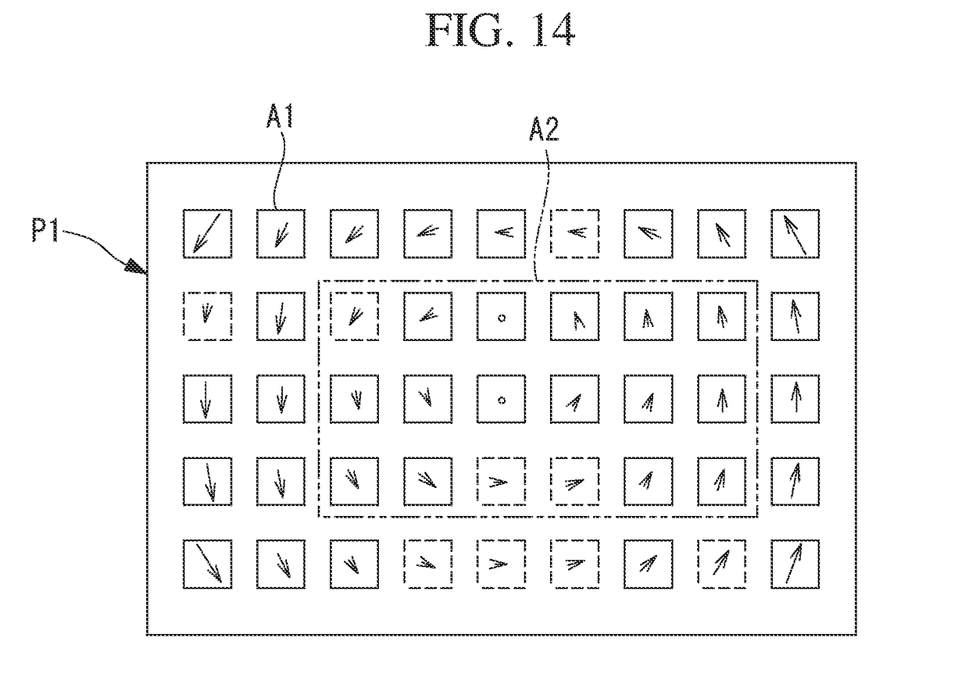
FIG. 14 is a diagram showing reliabilities in a superimposed manner on motion vectors that are the same as those in FIG. 5.

For example, in the case in which the motion vectors between the images P1 and P2 are calculated in the measurement regions A1 shown in FIG. 14, the measurement regions A1 in which the reliabilities of the motion vectors are high are indicated by solid lines and the measurement regions A1 in which the reliabilities of the motion vectors are low are indicated by broken lines. In addition, in FIG. 14, the first region of interest A2 is assumed to be the region surrounded by a one-dot chain line.

Figure 15:
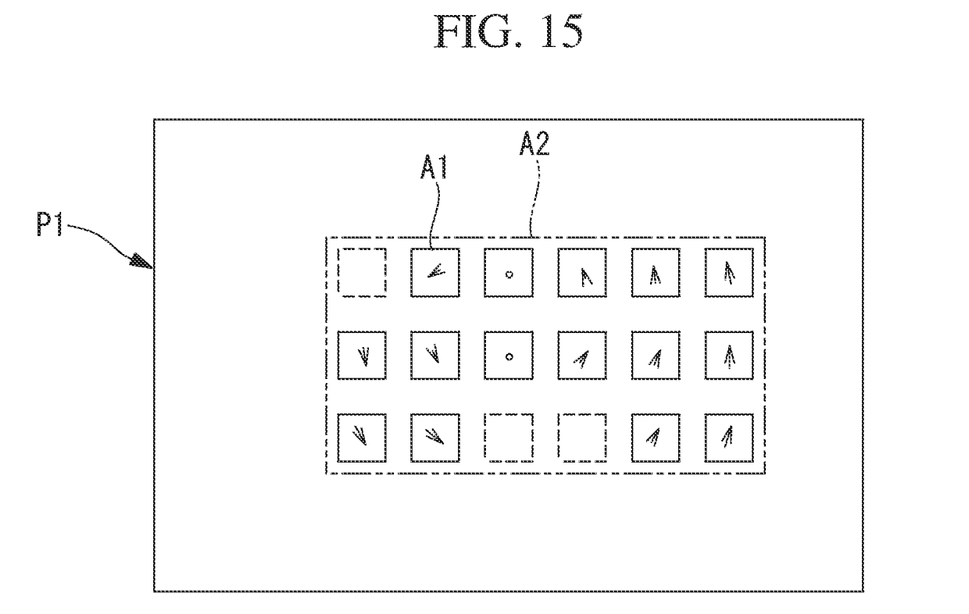
FIG. 15 is a diagram in which only the region of interest in FIG. 14 is identified.

In this case, the motion vectors that have high reliabilities and that are in the first region of interest A2 are identified, as shown in FIG. 15.

Figure 16:
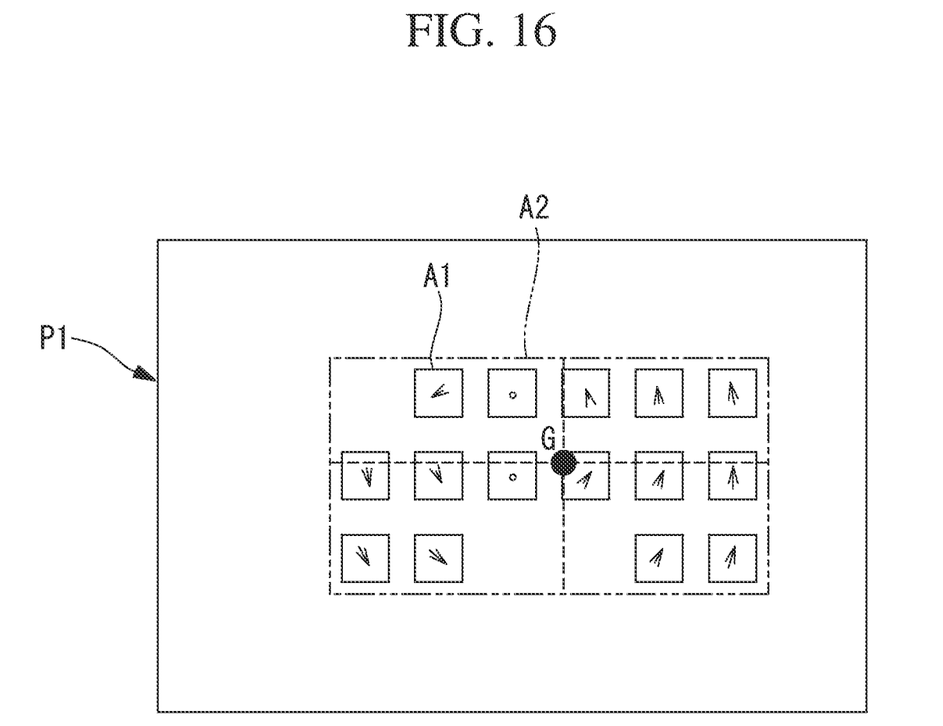
FIG. 16 is a diagram in which only motion vectors having high reliabilities in FIG. 15 are identified and that shows the center-of-gravity position and division lines dividing the region of interest into four regions in a superimposed manner.

In addition, FIG. 16 shows the result of calculating a center-of-gravity position G of the identified motion vectors.

Centered on the calculated center-of-gravity position G, the region is divided into four regions by a horizontal line and a vertical line that is orthogonal to the horizontal line, said lines passing through the center-of-gravity position G, and one arbitrary motion-vector is selected from each of the divided regions. Also, a homographic-transformation matrix is determined by means of the RANSAC algorithm or the like by using the four selected motion vectors. Accordingly, it is possible to estimate a homographic-transformation matrix with which the interior of the first region of interest A2 as a whole is appropriately positioned.

Note that, instead of the method in which the division into the four regions is performed by using the center-of-gravity coordinates of the vectors having high reliabilities, the division into the four regions may be performed simply by using the center coordinates of the first region of interest A2. In addition, it is also possible to apply this method to the case of setting the second region of interest A3; in particular, in the case in which the whole images P1 and P2 are set as the second region of interest A3, it is possible to perform the matrix estimation by respectively using the motion vectors that are positioned at the four corners or regions near the four corners of the images P1 and P2; and it is possible to estimate a homographic-transformation matrix with which the whole images P1 and P2 are appropriately positioned.

In addition, the present invention is not particularly limited with regard to the resolution of the combined image, and the combined image may be generated at the same resolution as the images acquired by means of image capturing or a combined image having a higher resolution than the images acquired by means of image capturing may be generated. In the case of generating a high-resolution combined image in which the resolution is respectively doubled in the horizontal direction and the vertical direction with respect to the images P1 and P2 acquired by means of image capturing, positioning may be performed at subpixel precision for each pixel.

The above-described embodiment also leads to the following aspects.

An aspect of the present invention is an image-processing device including: a motion-vector calculating portion that sets a plurality of discrete measurement regions in a standard image and a reference image selected from a plurality of images acquired in a time series manner and that calculates motion vectors in the respective measurement regions; a region-of-interest setting portion that sets a region of interest in the standard image; a motion-vector selecting portion that selects, from the plurality of motion vectors calculated by the motion-vector calculating portion, the motion vectors in the region of interest set by the region-of-interest setting portion; a matrix estimating portion that estimates a homographic-transformation matrix that represents a motion in the region of interest by using the motion vectors selected by the motion-vector selecting portion; and a matrix evaluating portion that evaluates an error in the homographic-transformation matrix on the basis of the homographic-transformation matrix estimated by the matrix estimating portion and the plurality of motion vectors calculated by the motion-vector calculating portion, wherein the region-of-interest setting portion sets, on the basis of the evaluation result by the matrix evaluating portion for the homographic-transformation matrix estimated on the basis of a first region of interest, a second region of interest a size of which is increased as compared with that of the first region of interest.

With this aspect, regarding the standard image and the reference image selected from the plurality of images acquired in a time series manner, the motion-vector calculating portion sets the plurality of discrete measurement regions and calculates the motion vectors in the respective measurement regions, and the region-of-interest setting portion sets the first region of interest in the standard image. Also, the motion-vector selecting portion selects the motion vectors in the first region of interest by using the plurality of calculated motion vectors, and the matrix estimating portion estimates the homographic-transformation matrix by using the selected motion vectors. The matrix evaluating portion evaluates the error in the estimated homographic-transformation matrix on the basis of the motion vectors.

In this case, the second region of interest, in which the size thereof is increased as compared with that of the first region of interest on the basis of the evaluation result of the homographic-transformation matrix estimated on the basis of the first region of interest, is set, the motion vectors are selected by employing the set second region of interest, and the homographic-transformation matrix is estimated. In other words, motions in the image periphery are taken into consideration to a greater degree in the homographic-transformation matrix estimated by using the second region of interest, in which the region size thereof is increased, as compared with the homographic-transformation matrix estimated by using the first region of interest; therefore, it is possible to generate a combined image in which position displacement is small all the way to the image periphery by using the estimated homographic-transformation matrix.

In the above-described aspect, the matrix evaluating portion may include: an error calculating portion that calculates errors between results of respectively applying the homographic-transformation matrix to position coordinates of the plurality of measurement regions and the motion vectors; and an error determining portion that determines, for each of the plurality of measurement regions, whether or not the error calculated by the error calculating portion is equal to or greater than a prescribed threshold.

With this configuration, it is possible to easily evaluate the error in the homographic-transformation matrix by means of the matrix evaluating portion.

In addition, in the above-described aspect, the matrix evaluating portion may include a matrix-estimation-mode selecting portion that selects a matrix estimation mode on the basis of the determination results obtained in the error determining portion.

With this configuration, it is possible to change and apply an appropriate matrix estimation mode in accordance with the presence/absence of depth in an imaging subject.

In addition, in the above-described aspect, the matrix-estimation-mode selecting portion may select: a first mode in which the homographic-transformation matrix is re-estimated by re-setting the region of interest on the basis of the determination results by the error determining portion; or a second mode in which one or more homographic-transformation matrices that are different from the homographic-transformation matrix estimated by the matrix estimating portion are estimated.

With this configuration, regarding images in which a flat imaging subject having a small depth is captured, the homographic-transformation matrix is estimated by re-setting the region of interest by using the first mode, and regarding images in which an imaging subject having a large depth is captured, different homographic-transformation matrices are applied to each of the regions by using the second mode; thus, it is possible to perform appropriate positioning for each of the regions.

In addition, in the above-described aspect, the region-of-interest setting portion may determine, when re-setting the region of interest, a size of a region to be increased on the basis of image-capturing information about the images acquired in a time series manner.

With this configuration, it is possible to appropriately increase the size of the region of interest in a simple manner on the basis of the image-capturing information about the images.

In addition, in the above-described aspect, the image-capturing information of the images may be an aperture value, and the region-of-interest setting portion may increase the size of the region to be increased with an increase in the aperture value.

With this configuration, because all parts of the image would be in focus when the aperture value is increased, it is possible to generate a combined image in which position displacement is small all the way to the image periphery by using a homographic-transformation matrix estimated by using a region of interest having a greater size.

In addition, in the above-described aspect, the image-capturing information of the images may be a distance to an imaging subject, and the region-of-interest setting portion may increase the size of the region to be increased with an increase in the distance.

With this configuration, because the motion amounts themselves decrease between the images with an increase in the distance to the imaging subject, it is possible to generate a combined image in which position displacement is small all the way to the image periphery by using a homographic-transformation matrix estimated by using a region of interest having a greater size.

In addition, in the above-described aspect, the motion-vector selecting portion may include: a motion-vector-reliability-threshold setting portion that additionally calculates reliabilities of the motion vectors and that sets a threshold for the calculated reliabilities; and a motion-vector identifying portion that identifies only the motion vectors for which the measurement regions of the motion vectors are in the region of interest and the reliabilities of the motion vectors are equal to or greater than the threshold.

The motion-vector reliabilities decrease in the case in which the subpixel-precision motion estimation is likely to fail, for example, a case in which the measurement regions have low contrasts or have high-frequency striped patterns.

With this configuration, because only the motion vectors of the measurement regions in which the motion-vector reliabilities are equal to or greater than the threshold and correct motions thereof are considered to be successfully estimated are identified, it is possible to generate a combined image in which position displacement is small.

In addition, in the above-described aspect, the matrix estimating portion may: divide the region of interest into four regions on the basis of a result of analyzing a position-coordinate distribution of the motion vectors; and determine the motion vectors to be used in matrix estimation from the divided four regions.

With this configuration, it is possible to estimate a homographic-transformation matrix for appropriately positioning the interior of the region of interest as a whole.

In addition, in the above-described aspect, the region-of-interest setting portion may set a region set by a user as the region of interest.

In addition, in the above-described aspect, the region-of-interest setting portion may set a region that includes at least some focus positions of the images acquired in a time series manner as the region of interest.

In addition, the above-described aspect may include an image combining portion that, by using the homographic-transformation matrix estimated by the matrix estimating portion, positions and combines the standard image and the reference image.

In addition, another aspect of the present invention is an image-processing method including: setting a plurality of discrete measurement regions in a standard image and a reference image selected from a plurality of images acquired in a time series manner and calculating motion vectors in the respective measurement regions; setting a region of interest in the standard image; selecting, from the plurality of calculated motion vectors, the motion vectors in the set region of interest; estimating a homographic-transformation matrix that represents a motion in the region of interest by using the selected motion vectors; evaluating the homographic-transformation matrix on the basis of the estimated homographic-transformation matrix and the plurality of calculated motion vectors; and re-setting, on the basis of the evaluation result, a new region of interest a size of which is increased as compared with that of the set region of interest.

In addition, another aspect of the present invention is an image-processing program for executing: a step of setting a plurality of discrete measurement regions in a standard image and a reference image selected from a plurality of images acquired in a time series manner and of calculating motion vectors in the respective measurement regions; a step of setting a region of interest in the standard image; a step of selecting, from the plurality of calculated motion vectors, the motion vectors in the set region of interest; a step of estimating a homographic-transformation matrix that represents a motion in the region of interest by using the selected motion vectors; a step of evaluating the homographic-transformation matrix on the basis of the estimated homographic-transformation matrix and the plurality of calculated motion vectors; and a step of re-setting, on the basis of the evaluation result, a new region of interest a size of which is increased as compared with that of the set region of interest.

REFERENCE SIGNS LIST 1 image-processing device
3 motion-vector calculating portion
4 region-of-interest setting portion
5 motion-vector selecting portion
6 matrix estimating portion
7 matrix evaluating portion
8 matrix-estimation-mode selecting portion
9 image combining portion
51 motion-vector-reliability-threshold setting portion
52 motion-vector identifying portion
71 error calculating portion
73 error determining portion
A1 measurement region
A2 first region of interest (region of interest)
A3 second region of interest (region of interest)
H1, H2, H3 homographic-transformation matrix
P1 standard image (image)
P2 reference image (image)

The invention claimed is:

1. An image-processing device comprising:
at least one processor comprising hardware, the processor being configured to:
set a plurality of discrete measurement regions in a standard image and a reference image selected from a plurality of images acquired in a time series manner and calculate motion vectors in the respective measurement regions;
set a region of interest in the standard image;
select, from the plurality of calculated motion vectors, the motion vectors in the set region of interest;
estimate a homographic-transformation matrix that represents a motion in the region of interest by using the selected motion vectors;
evaluate an error in the homographic-transformation matrix on the basis of the estimated homographic-transformation matrix and the calculated motion vectors; and
set, on the basis of the evaluation result for the homographic-transformation matrix estimated on the basis of a first region of interest, a second region of interest a size of which is increased as compared with that of the first region of interest.

2. The image-processing device according to claim 1, wherein the processor is configured to:
calculate errors between results of respectively applying the homographic-transformation matrix to position coordinates of the plurality of measurement regions and the motion vectors; and
determine, for each of the plurality of measurement regions, whether or not the calculated error is equal to or greater than a prescribed threshold.

3. The image-processing device according to claim 2, wherein the processor is configured to select a matrix estimation mode on the basis of the determination results.

4. The image-processing device according to claim 3, wherein the processor is configured to select: a first mode in which the homographic-transformation matrix is re-estimated by re-setting the region of interest on the basis of the determination results; or a second mode in which one or more homographic-transformation matrices that are different from the estimated homographic-transformation matrix are estimated.

5. The image-processing device according to claim 1, wherein the processor is configured to determine, when re-setting the region of interest, a size of a region to be increased on the basis of image-capturing information about the images acquired in a time series manner.

6. The image-processing device according to claim 5, wherein the image-capturing information of the images is an aperture value, and
the processor is configured to increase the size of the region to be increased with an increase in the aperture value.

7. The image-processing device according to claim 5, wherein the image-capturing information of the images is a distance to an imaging subject, and
the processor is configured to increase the size of the region to be increased with an increase in the distance.

8. The image-processing device according to claim 1, wherein the processor is configured to:
additionally calculate reliabilities of the motion vectors and set a threshold for the calculated reliabilities; and
identify only the motion vectors for which the measurement regions of the motion vectors are in the region of interest and the reliabilities of the motion vectors are equal to or greater than the threshold.

9. The image-processing device according to claim 1, wherein the processor is configured to:

divide the region of interest into four regions on the basis of a result of analyzing a position-coordinate distribution of the motion vectors; and determine the motion vectors to be used in matrix estimation from the divided four regions.

10. The image-processing device according to claim 1, wherein the processor is configured to set a region set by a user as the region of interest.

11. The image-processing device according to claim 1, wherein the processor is configured to set a region that includes at least some focus positions of the images acquired in a time series manner as the region of interest.

12. The image-processing device according to claim 1, wherein the processor is configured to, by using the estimated homographic-transformation matrix, position and combine the standard image and the reference image.

13. An image-processing method comprising:

setting a plurality of discrete measurement regions in a standard image and a reference image selected from a plurality of images acquired in a time series manner and calculating motion vectors in the respective measurement regions;

setting a region of interest in the standard image;

selecting, from the plurality of calculated motion vectors, the motion vectors in the set region of interest;

estimating a homographic-transformation matrix that represents a motion in the region of interest by using the selected motion vectors;

evaluating the homographic-transformation matrix on the basis of the estimated homographic-transformation matrix and the plurality of calculated motion vectors; and re-setting, on the basis of the evaluation result, a new region of interest a size of which is increased as compared with that of the set region of interest.

14. A non-transitory computer-readable medium having an image-processing program stored therein, the program causing a computer to execute functions of:

setting a plurality of discrete measurement regions in a standard image and a reference image selected from a plurality of images acquired in a time series manner and of calculating motion vectors in the respective measurement regions;

setting a region of interest in the standard image;

selecting, from the plurality of calculated motion vectors, the motion vectors in the set region of interest;

estimating a homographic-transformation matrix that represents a motion in the region of interest by using the selected motion vectors;

evaluating the homographic-transformation matrix on the basis of the estimated homographic-transformation matrix and the plurality of calculated motion vectors; and re-setting, on the basis of the evaluation result, a new region of interest a size of which is increased as compared with that of the set region of interest.

* * * * *